US012001548B2

(12) United States Patent
Kimon et al.

(10) Patent No.: US 12,001,548 B2
(45) Date of Patent: Jun. 4, 2024

(54) THREAT DETECTION USING MACHINE LEARNING QUERY ANALYSIS

(71) Applicant: PAYPAL, INC., San Jose, CA (US)

(72) Inventors: Liron Ben Kimon, Tel Aviv (IL); Yuri Shafet, Tel Aviv (IL)

(73) Assignee: PAYPAL, INC.

( * ) Notice: Subject to any disclaimer, the term of this patent is extended or adjusted under 35 U.S.C. 154(b) by 568 days.

(21) Appl. No.: 16/451,170

(22) Filed: Jun. 25, 2019

(65) Prior Publication Data

US 2020/0410091 A1 Dec. 31, 2020

(51) Int. Cl.
*H04L 29/06* (2006.01)
*G06F 16/245* (2019.01)
*G06F 21/55* (2013.01)
*G06N 20/00* (2019.01)

(52) U.S. Cl.
CPC .......... *G06F 21/552* (2013.01); *G06F 16/245* (2019.01); *G06F 21/554* (2013.01); *G06N 20/00* (2019.01); *G06F 2221/034* (2013.01)

(58) Field of Classification Search
CPC ................. G06F 21/552; G06F 16/245; G06F 2221/034; G06F 21/554; G06N 20/00
See application file for complete search history.

(56) References Cited

U.S. PATENT DOCUMENTS

| | | |
|---|---|---|
| 9,516,053 B1 | 12/2016 | Muddu et al. |
| 2007/0239638 A1 | 10/2007 | Zhuang et al. |
| 2008/0086432 A1 | 4/2008 | Schmidtler et al. |
| 2008/0215607 A1 | 9/2008 | Kaushansky et al. |
| 2011/0145178 A1 | 6/2011 | Schmidtler et al. |
| 2013/0097706 A1 | 4/2013 | Titonis et al. |
| 2013/0247187 A1* | 9/2013 | Hsiao ...................... G06F 21/56 726/22 |
| 2014/0207717 A1 | 7/2014 | Schmidtler et al. |
| 2015/0169754 A1* | 6/2015 | Gu ...................... G06F 16/5838 707/728 |

(Continued)

OTHER PUBLICATIONS

Florian Schroff, Dmitry Kalenichenko, James Philbin, "FaceNet: A Unified Embedding for Face Recognition and Clustering," pp. 1-10; Jun. 17, 2015; retrieved from the internet <https://arxiv.org/pdf/1503.03832.pdf>.

(Continued)

*Primary Examiner* — Evans Desrosiers
(74) *Attorney, Agent, or Firm* — Haynes and Boone, LLP

(57) ABSTRACT

Within an organization, numerous different persons can access data. But a user account with database access may be compromised, leading to data theft and data destruction. Database queries used to access data may vary in length, content, and formatting. Features of these queries can be extracted to train a machine learning classifier. Queries for users can be mapped to a vector space and when a new sample query is received, it can be assessed using the classifier to determine its level of similarity with previous queries by that user and other users. By analyzing the results of this assessment on the new query, it can be determined if this new query represents a data access anomaly—e.g. a particularly unusual query for a user, given his or her past, that may indicate user credentials have been compromised. When a data access anomaly exists, a remedial action may be take.

20 Claims, 6 Drawing Sheets

(56) References Cited

U.S. PATENT DOCUMENTS

| | | | |
|---|---|---|---|
| 2015/0379887 | A1 | 12/2015 | Becker et al. |
| 2016/0283715 | A1 | 9/2016 | Duke et al. |
| 2017/0098219 | A1 | 4/2017 | Peram et al. |
| 2017/0200066 | A1 | 7/2017 | Wang et al. |
| 2018/0046939 | A1 | 2/2018 | Meron et al. |
| 2018/0089271 | A1 | 3/2018 | Kosuru et al. |
| 2019/0005408 | A1 | 1/2019 | Tolpin et al. |
| 2019/0018956 | A1 | 1/2019 | Sadaghiani et al. |
| 2019/0034932 | A1 | 1/2019 | Sadaghiani et al. |
| 2019/0102553 | A1 | 4/2019 | Herwadkar et al. |
| 2020/0311145 | A1* | 10/2020 | Li ............... G06F 16/90332 |
| 2020/0349183 | A1* | 11/2020 | Jayaraman ............ G06F 16/353 |
| 2020/0380384 | A1* | 12/2020 | Karunaratne .......... G06N 20/10 |
| 2020/0404016 | A1* | 12/2020 | Pike .................... H04L 63/1408 |

OTHER PUBLICATIONS

Waheed Anwar, Imran Sarwar Bajwa, and Shabana Ramzan; "Design and Implementation of a Machine Learning-Based Authorship Identification Model," published Jan. 16, 2019; Hindawi Scientific Programming vol. 2019, Article ID 9431073, 14 pages; Pakistan; retrieved from the internet, <https://doi.org/10.1155/2019/9431073>.

Navoneel Chakrabarty, "A Machine Learning Approach to Author Identification of Horror Novels from Text Snippets," Jan. 23; retrieved from the internet, <https://towardsdatascience.com/a-machine-learning-approach-to-author-identification-of-horror-novels-from-text-snippets-3f1ef5dba634?gi=f02a77d4b642>.

Saad M. Darwish, "Machine learning approach to detect intruders in database based on hexplet data structure," Journal of Electrical Systems and Information Technology, vol. 3, Issue 2, Sep. 2016, pp. 261-269; retrieved online <https://www.sciencedirect.com/science/article/pii/S2314717216300241>.

Louise Matsakis, "Even Anonymous Coders Leave Fingerprints," Aug. 10, 2018, retrieved online <https://www.wired.com/story/machine-learning-identify-anonymous-code/>.

Michie et al The Human Behaviour-Change Project: harnessing the power of artificial-intelligence and machine learning for evidence synthesis and interpretation. In: Implementation Science. Oct. 18, 2017 (Oct. 18, 2017) Retrieved on Aug. 15, 2020 (Aug. 15, 2020) from <https://Hnk.springer.com/contenVpdf/10.1186/s13012-017-0641-5.pdf> entire document, Oct. 4, 2021.

Knorr. "How PayPal beats the bad guys with machine learning." In: InfoWorld. Apr. 13, 2015 .,.. (Apr. 13, 2015) Retrieved on Aug. 15, 2020 (Aug. 15, 2020) from <https://w w w.infoworld.com/article/2907877/how-paypal-reduces-fraud-w ith-machine-learning.html> entire document.

Asmaa Sallam et al.; "DBSAFE—An Anomaly Detection System to Protect Databases from Exfiltration Attempts"; IEEE Systems Journal, vol. 11, No. 2, Jun. 2017, pp. 483-493.

Asmaa Sallam et al.; "Techniques and Systems for Anomaly Detection in Database Systems"; Computer Sciences Department, Purdue University, West Lafayette, IN, USA; Springer Nature Switzerland AG 2019; 21 pages.

Sunu Mathew et al.; "A Data-Centric Approach to Insider Attack Detection in Database Systems"; Information Security, Amazon.com Inc., Seattle WA 98104, USA; mathew@amazon.com; Computer Science and Engineering University at Buffalo Buffalo, NY 14260, USA; 20 pages.

\* cited by examiner

*Example Database Queries*

205  SELECT Cust_No, First_Name FROM Customers WHERE Last_Name='Smith';

210  SELECT First_Name, Nickname FROM Friends WHERE Nickname LIKE '%brain%';

215  SELECT EMP_ID, LAST_NAME FROM EMPLOYEE_TBL WHERE CITY = 'INDIANAPOLIS' ORDER BY EMP_ID asc;

220  SELECT SUM(Salary)FROM Employee WHERE Emp_Age < 30;

225  SELECT ID FROM Customers INNER JOIN Orders ON Customers.ID = Orders.ID

THREAT DETECTION USING MACHINE LEARNING QUERY ANALYSIS

TECHNICAL FIELD

This disclosure relates to improvements in computer security and threat detection that are also associated with machine learning and artificial intelligence technology, in various embodiments.

BACKGROUND

Companies are faced with a variety of computer security threats, some external, some internal. External threats may take the form of outside attackers attempting to compromise system networks and/or machines in order to cause damage, extract data, or take other nefarious action.

Internal computer security threats likewise have potential for harm. This harm can sometimes be even greater than an external threat, depending on the level of access that is associated with a particular insider. If a contractor or employee login and/or network credential is compromised (through a phishing attack, or any other kind of attack), internal systems, networks, and data may all be at risk. This security threat may be particularly high if the compromised credentials provide access to particular databases within the organization.

Applicant recognizes a need for improved detection of such potential insider threats and has developed a solution, as further discussed below.

DETAILED DESCRIPTION

Figure 1:
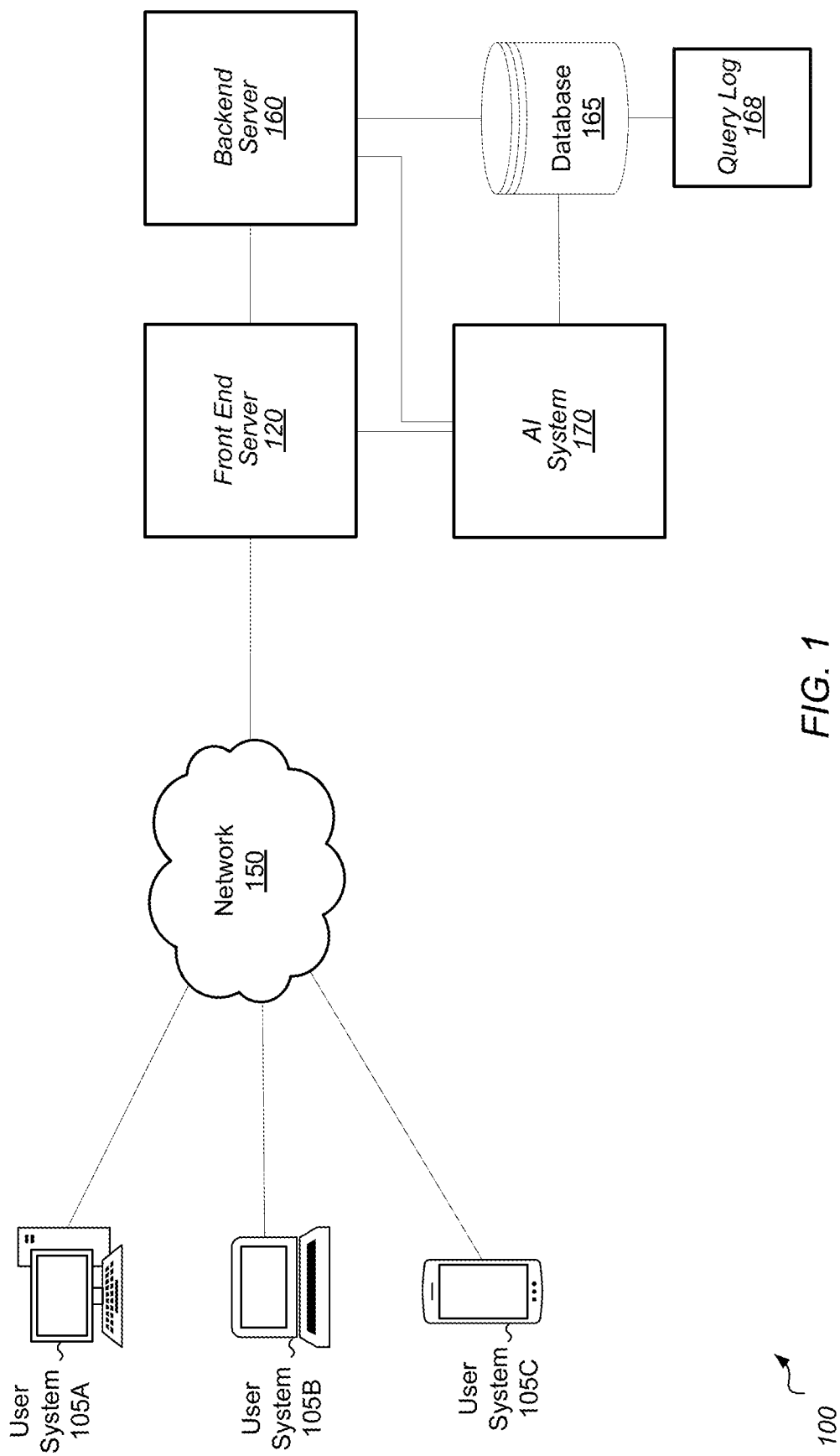
FIG. 1 illustrates a block diagram of a system including user systems, a front end server, backend server, AI system, and database, according to some embodiments.

Techniques are described relating to computer security and data breach threat identification using machine learning and artificial intelligence.

Within an organization, numerous different persons may have access to different databases. This access may be provided in order for those persons to accomplish their jobs—that is, the access is necessary. Nonetheless, the possibility exists that a user account that has database query access may be compromised. Identifying such a compromised account can prevent data loss and data destruction. Another possible data theft scenario is presented by a contractor or employee who plans to depart an organization and before leaving, downloads customer data, engineering schematics, or other strategic data. Preventing or mitigating such a scenario also improves computer and organizational security.

The different users who have database access may read, modify, delete, or add data, among other things. These operations can be performed via a database query (e.g. a sequence of one or more commands for the database to execute). Such queries may vary in length, content, and formatting/styling. Numerous different features (e.g. characteristics) of these queries can be extracted by a feature extraction algorithm. The extracted features can then be used to essentially profile different users, through the targeted application of machine learning & artificial intelligence technology.

Queries for each of a number of users can be mapped to a vector space such that each user's queries are clustered relatively close together, but have some distance between queries by other users. When a new sample query is received, it can be assessed (through a trained machine learning classifier) to determine its level of similarity with previous queries by that user, as well one or more other users who may behave similarly to the querying user (e.g. nearby neighboring users within a vector space) and one or more other users who do not write similar queries to the querying user (e.g. one or more distant users within the vector space).

By analyzing the results of this assessment on the new query, it can be determined if this new query represents a data access anomaly—e.g. a particularly unusual query for a user, given his or her past, that may indicate user security credentials have been compromised, or that some other kind of data breach may be occurring. When a data access anomaly is determined to exist, one or more remedial actions may also be executed. These remedial actions can include increasing logging or locking a user account for further investigation, among other options. The techniques outlined below thus provide for increased computer and data security, in various embodiments.

This specification includes references to "one embodiment," "some embodiments," or "an embodiment." The appearances of these phrases do not necessarily refer to the same embodiment. Particular features, structures, or characteristics may be combined in any suitable manner consistent with this disclosure.

"First," "Second," etc. As used herein, these terms are used as labels for nouns that they precede, and do not necessarily imply any type of ordering (e.g., spatial, temporal, logical, cardinal, etc.).

Various components may be described or claimed as "configured to" perform a task or tasks. In such contexts, "configured to" is used to connote structure by indicating that the components include structure (e.g., stored logic) that performs the task or tasks during operation. As such, the component can be said to be configured to perform the task even when the component is not currently operational (e.g., is not on). Reciting that a component is "configured to" perform one or more tasks is expressly intended not to invoke 35 U.S.C. § 112(f) for that component.

Turning to FIG. 1, a block diagram of a system 100 is shown, according to various embodiments. In this diagram, system 100 includes user systems 105A, 105B, and 105C. System 100 also includes front end server 120, backend server 160, database 165, AI system 170 (artificial intelligence system 170), and network 150. The techniques described herein can be utilized in the environment of system 100, as well as numerous other types of environment.

Note that many other permutations of FIG. 1 are contemplated (as with all figures). While certain connections are shown (e.g. data link connections) between different components, in various embodiments, additional connections and/or components may exist that are not depicted. As will be appreciated by one of skill in the art, various devices may be omitted from this diagram for simplicity—thus, in various embodiments, routers, switches, load balancers, computing clusters, additional databases, servers, and firewalls, etc., may all be present and utilized. Components may be combined with one other and/or separated into one or more systems in this figure, as in other figures.

User systems 105A, 105B, and 105C ("user systems 105") may be any user computer system that can potentially interact with front end server 120, according to various embodiments. Front end server 120 may send communications to users, such as emails, text messages, etc. These communications may contain personalized content created based on an association of a particular country with a particular person, in some embodiments.

Front end server 120 may also provide web pages that facilitate one or more services, such as account access and electronic payment transactions (as may be provided by PayPal.com™). Front end server 120 may thus facilitate access to various electronic resources, which can include an account, data, and various software programs/functionality, etc. A user of user system 105A may receive communications from front end server 120. Front end server 120 may be any computer system configured to provide access to electronic resources. This can include providing communications to users and/or web content, in various embodiments, as well as access to functionality provided a web client (or via other protocols, including but not limited to SSH, FTP, database and/or API connections, etc.). Services provided may include serving web pages (e.g. in response to a HTTP request) and/or providing an interface to functionality provided by backend server 160 and/or database 165. Database 165 may include various data, such as user account data, system data, and any other information. Multiple such databases may exist, of course, in various embodiments, and can be spread across one or more data centers, cloud computing services, etc. Front end server 120 may comprise one or more computing devices each having a processor and a memory. Network 150 may comprise all or a portion of the Internet.

Front end server 120 may correspond to an electronic payment transaction service such as that provided by PayPal™ in some embodiments, though in other embodiments, front end server 120 may correspond to different services and functionality. Front end server 120 and/or backend server 160 may have a variety of associated user accounts allowing users to make payments electronically and to receive payments electronically. A user account may have a variety of associated funding mechanisms (e.g. a linked bank account, a credit card, etc.) and may also maintain a currency balance in the electronic payment account. A number of possible different funding sources can be used to provide a source of funds (credit, checking, balance, etc.). User devices (smart phones, laptops, desktops, embedded systems, wearable devices, etc.) can be used to access electronic payment accounts such as those provided by PayPal™. In various embodiments, quantities other than currency may be exchanged via front end server 120 and/or backend server 160, including but not limited to stocks, commodities, gift cards, incentive points (e.g. from airlines or hotels), etc. Front end server 120 may also correspond to a system providing functionalities such as API access, a file server, or another type of service with user accounts in some embodiments (and such services can also be provided via front end server 120 in various embodiments).

Database 165 can include a transaction database having records related to various transactions taken by users of a transaction system in the embodiment shown. These records can include any number of details, such as any information related to a transaction or to an action taken by a user on a web page or an application installed on a computing device (e.g., the PayPal™ app on a smartphone). Many or all of the records in database 165 are transaction records including details of a user sending or receiving currency (or some other quantity, such as credit card award points, cryptocurrency, etc.). The database information may include two or more parties involved in an electronic payment transaction, date and time of transaction, amount of currency, whether the transaction is a recurring transaction, source of funds/type of funding instrument, and any other details. Such information may be used for bookkeeping purposes as well as for risk assessment (e.g. fraud and risk determinations can be made using historical data; such determinations may be made using systems and risk models not depicted in FIG. 1 for purposes of simplicity). As will be appreciated, there may be more than simply one database in system 100. Additional databases can include many types of different data beyond transactional data. Any description herein relative to database 165 may thus be applied to other (non-pictured) databases as well. Query log 168 may contain a record of some or all database queries executed on database 165.

Backend server 160 may be one or more computing devices each having a memory and processor that enable a variety of services. Backend server 160 may be deployed in various configurations. In some instances, all or a portion of the functionality for web services that is enabled by backend server 160 is accessible only via front end server 120 (e.g. some of the functionality provided by backend server 160 may not be publicly accessible via the Internet unless a user goes through front end server 120 or some other type of gateway system). Backend server 160 may perform operations such as risk assessment, checking funds availability, among other operations.

AI system 170 likewise may be one or more computing devices each having a memory and processor. In various embodiments, AI system 170 performs operations related to training a machine learning classifier and/or user the trained classifier to identity anomalous database queries. AI system 170 may transmit information to and/or receive information from a number of systems, including database 165, front end server 120, and back end server 160, as well as other systems, in various embodiments.

Figure 2:
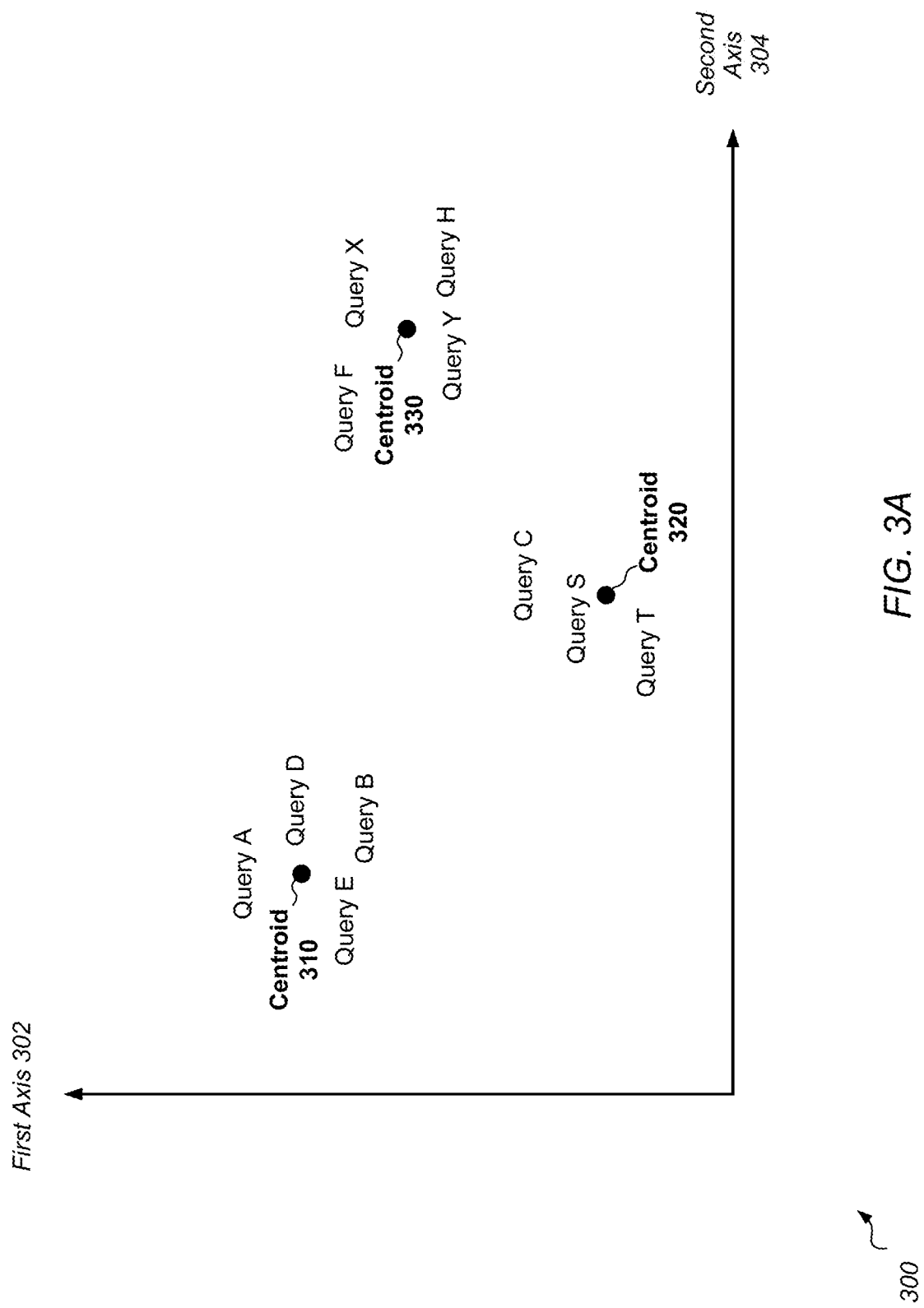
FIG. 2 illustrates a diagram showing some examples of database queries, according to some embodiments.

Turning to FIG. 2, a diagram 200 is shown of some example database queries. Queries 205, 210, 215, 220, and 225 are each different queries in the SQL language. The present techniques can be used with multiple different types of database languages, and are not limited to SQL, however.

As can be seen, database queries can vary in their content. Each particular query may include one or more different commands executable by a database. These commands may cause data to be modified, deleted, or added to a database. The commands may also allow retrieval of various information, and modification to particular structures within the database (e.g. joining of tables, creation or deletion of existing tables, etc.).

The queries shown in FIG. 2 are not especially lengthy, but database queries may be multiple lines and contain a number of different commands in various embodiments. A database query, as discussed herein, thus is not limited to a single command. A database query may be contained in a script file and/or macro, and can be executed this way, or can be executed manually via a command line interface, for example. Queries submitted to a database can be logged and stored in query log 168. These logs can be accessed in order to do analysis and determine if any data access anomalies are present.

Figure 3:
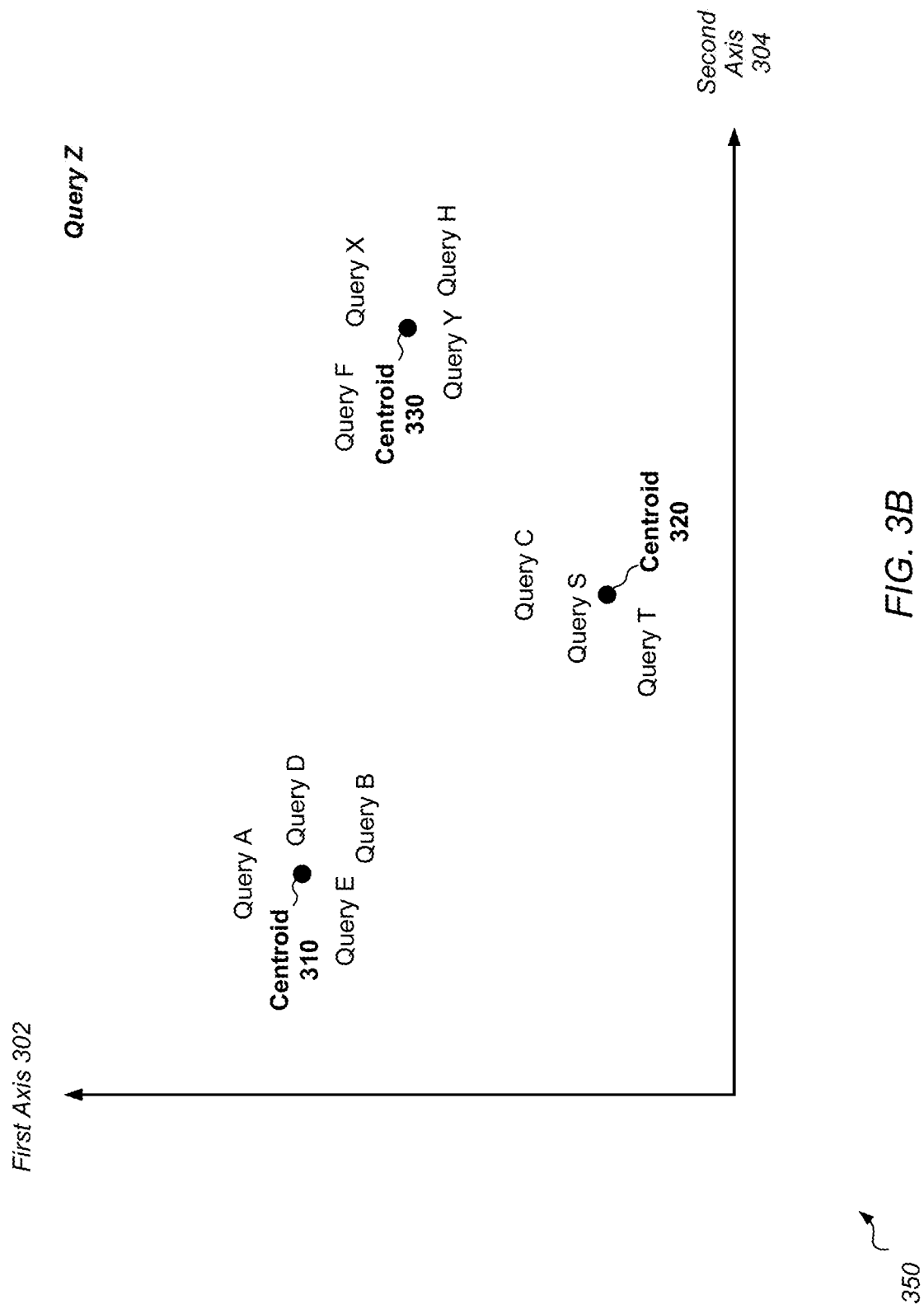
FIG. 3A illustrates a representation of a vector space resulting from training a machine learning classifier on query data, according to some embodiments.
FIG. 3B illustrates a further representation of a vector space resulting from training a machine learning classifier on query data, with an additional query shown, according to some embodiments.

Turning to FIG. 3A, a diagram 300 is shown of a representation of a vector space resulting from training a machine learning classifier, according to some embodiments. In this figure, a first axis 302 and a second axis 304 are shown on the graph. This graph is a simplified two dimensional representation of a vector space; note that in many instances however, the vector space may have many different dimensions (e.g. 3 dimension, 10 dimensional, 40 dimensional, or some other number based on features consumed by the ML classifier).

Three different centroids—310, 320, and 330—are shown in this figure. The first centroid 310 is surrounded by nearby queries A, B, D, and E, which all are associated with a first user (e.g. that user has executed those queries against one or more databases). Centroid 320 is likewise near queries C, S, and T, which are queries associated with a second user. Centroid 330 is near queries F, H, X, and Y, which are associated with a third user.

In this example, the centroids represent an averaged location for database queries that are associated with different users. The vector space represented in FIG. 3A is a product of a trained ML classifier—e.g., the location of each of the queries (and by extension, the centroids) is an output of the trained classifier when feature data for those queries is provided to the classifier.

In FIG. 3B, a diagram 350 is shown of a further representation of a vector space resulting from training a machine learning classifier, with an additional query shown, according to some embodiments.

A new query (Query Z) is shown as being present in the top right of the vector space. This query is associated as the same user—a first user—who is already associated with queries A, B, D, and E. The centroid for this user is centroid 310.

As can be seen, Query Z is a significant distance from centroid 310 in the vector space. In other words, the features of this new query are different enough from other queries associated with the first user that the new query maps to a distance location within the vector space. This distance is indicative that the new query may represent a data access anomaly—this query could have been generated as a result of an account security breach, for example. Being able to identify these anomalies means that one or more remedial actions can be taken, however, to prevent and/or mitigate the effects of a possible security breach.

Figure 4:
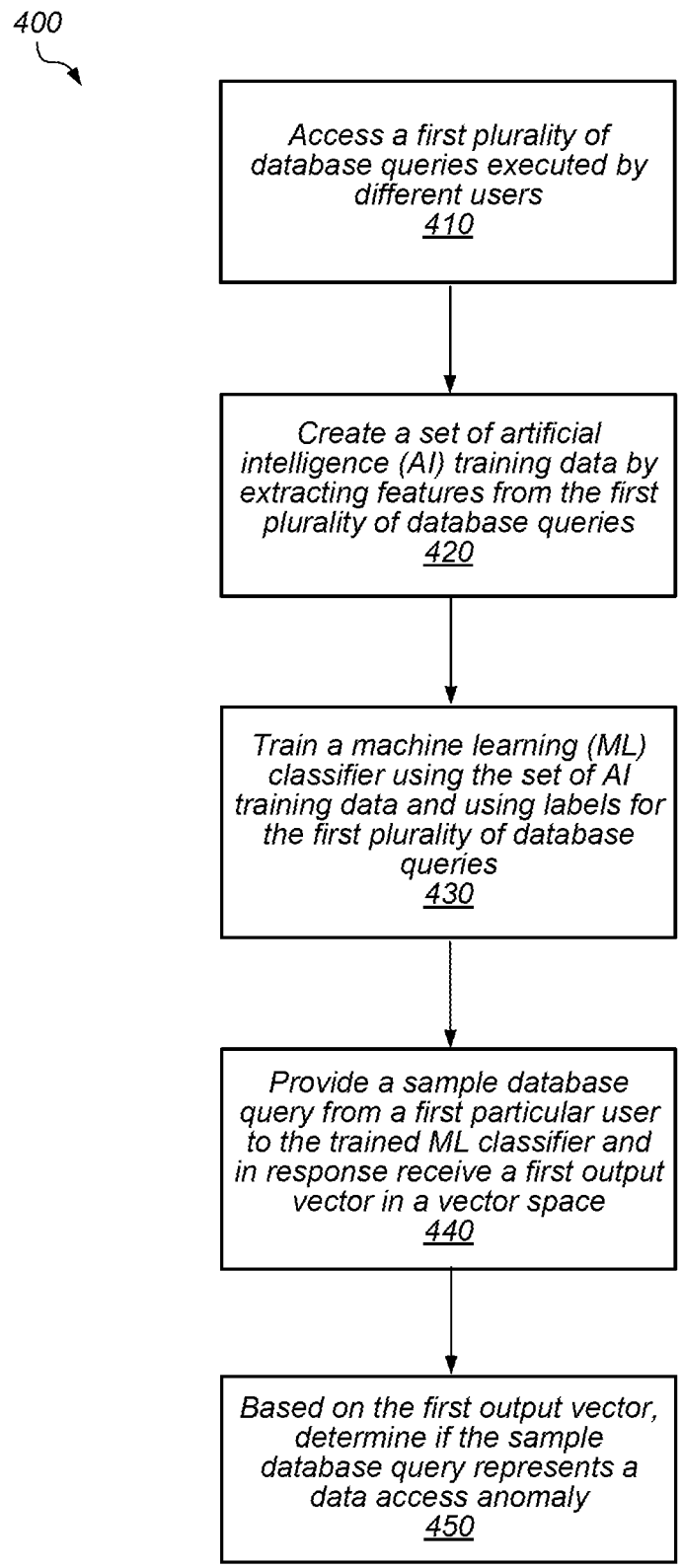
FIG. 4 illustrates a flowchart of a method relating to determining if a database query represents a data access anomaly, according to some embodiments.

Turning to FIG. 4, a flowchart is shown of a method 400 relating to determining if a database query represents a data access anomaly, according to some embodiments.

Operations described relative to FIG. 4 may be performed, in various embodiments, by any suitable computer system and/or combination of computer systems, including AI system 170. For convenience and ease of explanation, operations described below will simply be discussed relative to AI system 170 rather than any other system, however. Further, various operations and elements of operations discussed below may be modified, omitted, and/or used in a different manner or different order than that indicated. Thus, in some embodiments, AI system 170 may perform one or more operations while another system might perform one or more other operations.

In operation 410, AI system 170 access a first plurality of database queries executed by a plurality of different users on one or more databases, according to various embodiments. These queries can be used as a basis for machine learning techniques described further below.

These database queries can be in one or more different query languages. Some query languages that may be present in the queries include SQL variants and/or NoSQL variants, Contextual Query Language (CQL), Java Persistence Query Language (JPQL), embedded SQL, access query language, Cypher Query Language, Hyper Text Structured Query Language (HTSQL), Object Query Language (OQL), Molecular Query Language (MQL), Lightweight Directory Access Protocol (LDAP), RDF query language (RDQL), ISBL (Information Systems Base Language), Multidimensional Expressions (MDX), Object Constraint Language (OCL), Data Mining Extensions (DMX), or others. (Note that various items listed above may include SQL and/or NoSQL variants).

The queries may relate to a single database, or a number of different databases. These databases may be relational databases, and may be within a single organization (i.e. company) or be spread across two or more different organizations. The database queries may be accessed by retrieving log information from query log 168, in various embodiments. Each of the queries may be associated with a particular user—e.g., a user who has executed a query against one or more databases.

In operation 420, AI system 170 creates a set of artificial intelligence (AI) training data by extracting a plurality of features from each of the first plurality of database queries, where each of the plurality of features relates to a different attribute of the queries, according to various embodiments.

Feature extraction can be performed using an algorithm that processes text contained in a database query. Different users may write queries in different styles, and thus the queries can be processed to determine some of the features that differentiate queries associated with different users. Feature extraction can include running one or more scripts on the queries to process their text.

Some features that are extracted, in various embodiments, include number of lines in a query, number of tabs (e.g. at the start of a line), number of semi-colons; number of lines with a capital letter in them and/or number of lines beginning with a capital letter; length of query (e.g. in characters); total number of capital letters; total number of lowercase letters; total number of uppercase words; total number of lowercase words; number of total comments in the query; number of total comments of a first style in the query (some query languages allow for different styles of comments); number of total comments of a second style in the query; total number of each different type of command statement in the query (e.g. number of SELECT commands, JOIN commands, etc.); and/or total number of aliases appearing in the query (in some query languages if a table name is lengthy, a user can alias the table name to a shorter name that is more convenient to type).

Additional features may also be extracted in various embodiments. Each of the features may thus relate to a different attribute of a query, as seen above. These attributes can relate to one another, however (e.g. there may be correlation between total number of capital letters and total number of uppercase words). The extracted features form a vector space that can be used for machine learning (e.g. a first feature may be a first dimension of the vector space, a second feature can be a second dimension of the vector space, etc.).

Note that the set of artificial intelligence (AI) training data may include only query data for users that have a minimum threshold number of previous database queries associated with them. That is, in various embodiments, a user has to have a minimum number of queries (e.g. 5 queries, 20 queries, 60 queries, or some other number) for the queries associated with that user to be included in the training set. If only a small number of queries were used (e.g. a user has only two previous queries) the results might prove unreliable as a sufficient past history of the user's habits and tendencies in writing queries has not yet been established.

In operation 430, AI system 170 trains a machine learning classifier using the set of AI training data and using corresponding labels for each of the first plurality of database queries, according to various embodiments. Each of these labels may indicate an identity of one of the plurality of different users that is associated with a particular query, and the trained ML classifier is configured to produce vector outputs in a vector space in response to receiving database queries, according to various embodiments.

In some embodiments, an artificial neural network (ANN) is trained using the set of AI training data. In the training process, many different queries can be input into an ANN. The ANN will seek to place queries by a same user close together in the vector space, but simultaneously place queries by other users at a distance, in various embodiments. This allows for good differentiation between different users in the vector space. Different neuron values within different layers of the ANN may be adjusted to achieve these goals (e.g. changing a neuron value up or down, running the training data through the ANN to see what the resulting vector space, then comparing that to other results to see if it was an improvement or deterioration in performance). The resulting ANN after training forms a trained machine learning classifier. The training process may also include data dropout between different layers of the ANN to avoid the classifier becoming overtrained and to instead retain better general performance.

A centroid for a user, as discussed herein, refers to an average vector defined by various queries associated with that user. (The average vector can be calculated using weighting for component vectors, or as a straight average in various embodiments.) Each user's queries may thus have a particular centroid within the vector space. The training process seeks to ensure that these centroids for different users have a threshold distance between one another (e.g. a minimum average threshold distance between centroids may be used where the distances between all centroids are measured and averaged, and/or a minimum absolute distance between any two centroids may be used, and/or other particular criteria may be used in training the classifier). The training process affects how a particular set of features (for a database query) are mapped to a particular location/vector within a vector space.

In some embodiments a loss formula is used in training the classifier. This formula is:

$$Loss = (Distance(E,N) + beta*Distance(E,M)) - Distance(E,D) + alpha$$

in various embodiments. In this formula, E is the user embedding (e.g. the centroid for a user's previous queries). N is a new query for that user—i.e. a query that is being evaluated for a potential data access anomaly. The distance function provides a distance measurement in the vector space. Thus, Distance(E, N) represents a distance between the user's centroid and the new query.

M is a neighboring user within the vector space (this could be someone on the user's team within the organization who executes similar types of queries, for example). Thus, Distance (E, M) represents a distance between the user's centroid and a neighboring centroid of another user. The neighboring centroid may be chosen with partial or complete randomness in some circumstances, or may be specifically selected other circumstances. The beta parameter may be a value ranging from 0 to 1, in some embodiments, that provides a weighting as to the importance of of a neighboring user.

D is the centroid for a different user whose centroid may be some minimum threshold distance away from the user. The distant centroid D may likewise be chosen with partial or complete randomness in some circumstances, or may be specifically selected other circumstances. Accordingly, Distance(E, D) may represent the distance between a querying user's centroid and the centroid of a distant other user's centroid. The alpha parameter may be a constant value to provided regularization in the above formula, with a large alpha requiring larger distance between the querying user's centroid and a neighboring user centroid. This loss function can be used (along with the alpha and beta parameters) to tune the training of the classifier.

Accordingly, after training, the classifier is configured to receive a particular database query and to output a vector that places the query within a vector space. This output vector can be used to determine if data access anomalies exist, as explained further below.

In operation 440, AI system 170 provides a sample database query from a first particular user to the trained machine learning classifier and in response, receives a first output vector in the vector space, according to various embodiments.

After training, the classifier may essentially learn a mapping, where a particular input of features (extracted from a database query) will produce an output vector within a vector space. Operation 440 produces a particular output vector for a query that may represent a potential data access anomaly—i.e., a potential security threat. Using this output vector, additional analysis can then be performed to see if this query appears distinctly different enough from other previous queries (e.g. by the user and/or by neighboring users) to warrant a possible remedial action designed to prevent or mitigate a data breach.

In operation 450, AI system 170 determines, based on the first output vector, if the sample database query represents a data access anomaly, according to various embodiments. This determination may include, in various forms, measuring distances between the first output vector and other locations within the vector space (e.g. a centroid for the querying user and/or centroids for other querying users).

In one approach, the nearest N user centroids are determined based on a distance between those centroids and the first output vector, where N is an integer one or greater. Then a determination is made as to whether the querying user's centroid appears in the list of closest centroids. The value for N may be predetermined in various embodiments, but in some instances may be set to 3, 5, or some other number as desired.

A presumption in this approach is that a user's particular centroid (based on their past queries) should be somewhat close to a new query from that same user. If a first user A makes a query, and N=5, then AI system 170 determines whether the centroid for user A appears within the five closest centroids to the first output vector for the new query. If the closes N neighboring centroids do not contain the querying user's centroid, however, then a data access anomaly is deemed to be present.

In another approach, a distance formula may be used in order to determine whether a sample query represents a data access anomaly. The distance between the querying user's particular centroid and the new query may be determined. Based on the magnitude of this distance, a probability can then be assessed regarding whether the query looks anomalous. For example, the average distance from the user's centroid to other queries of the user may be a distance of 0.2, with a standard deviation of 0.1. If the distance between the new query and the existing centroid is then found to be 2.8, for example, then the new query is highly likely to be anomalous. Statistical analysis regarding the distribution of queries by the querying user, as well as other users, can be used in determining how anomalous a particular query appears to be. If a certain threshold value (e.g. 99.99%, or a distance magnitude of 1.0, or some other threshold value) is reached, then the query is deemed to represent a data access anomaly.

Note that in various instances, once a machine learning classifier is trained using an existing set of training data, the classifier does not have to be re-trained even if new users and/or new user queries come up after the initial training. The initial training can cause the ML classifier to learn a particular transformation that embeds the queries in particular locations for the vector space. This transformation can also apply to new users. Thus, if an employee is newly hired after the initial training, once that employee has a sufficient threshold number of database queries (e.g. 20 queries, 60 queries, or some other number), then those queries can be used to generate a query centroid for that user. That query centroid can then be used to determine if future queries for that user are anomalous.

Remedial actions may be taken if a data access anomaly is determined to exist for a particular database query. Some actions may be taken automatically (e.g. without human initiation) and some may be taken based on human input (e.g. based analysis from a system administrator and/or security analyst).

One remedial action is to transmit an alert indicating the data access anomaly. An alert could be sent in the form of an email, text message, chat instant message, or some other form to a supervisor of an employee whose account is associated with the sample database query, for example, or such an alert could be sent to a system administrator and/or security specialist. Another remedial action would be to disallow the query. Yet another remedial action would be to place the query in a hold queue and require approval of at least one other authorized person (e.g. within the organization) before allowing its execution. Another remedial action would be to add additional logging for the sample query and/or add additional logging for the associated user account (e.g. more details on all queries going forward that are associated with that account for at least some period of time).

Remedial actions may also be taken based on the severity of the data access anomaly and/or the data being accessed in the sample query. A data access anomaly that is only slightly anomalous (e.g. past a threshold for anomaly, but perhaps only within 20% of that threshold) might be logged while a data access anomaly that is highly anomalous (e.g. 99.999% unlikely based on past queries for that user) might result in a harsher remedial action such as account locking. Likewise, remedial action may also be based on a number of anomalous queries within a particular time period. A first data access anomaly might simply result in an alert being sent, for example, while five data access anomalies within an hour, day, or some other time period might result in the associated user account being automatically locked due to the higher level of suspicious activity.

Computer-Readable Medium

Figure 5:
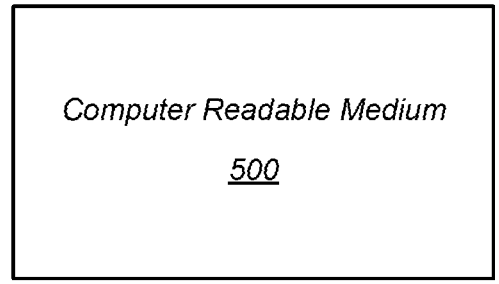
FIG. 5 is a diagram of a computer readable medium, according to some embodiments.

Turning to FIG. 5 a block diagram of one embodiment of a computer-readable medium 500 is shown. This computer-readable medium may store instructions corresponding to the operations of FIG. 4 and/or any techniques described herein. Thus, in one embodiment, instructions corresponding to AI system 170 may be stored on computer-readable medium 500.

Note that more generally, program instructions may be stored on a non-volatile medium such as a hard disk or FLASH drive, or may be stored in any other volatile or non-volatile memory medium or device as is well known, such as a ROM or RAM, or provided on any media capable of staring program code, such as a compact disk (CD) medium, DVD medium, holographic storage, networked storage, etc. Additionally, program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the present invention can be implemented in any programming language that can be executed on a server or server system such as, for example, in C, C+, HTML, Java, JavaScript, or any other scripting language, such as Perl. Note that as used herein, the term "computer-readable medium" refers to a non-transitory computer readable medium.

Computer System

Figure 6:
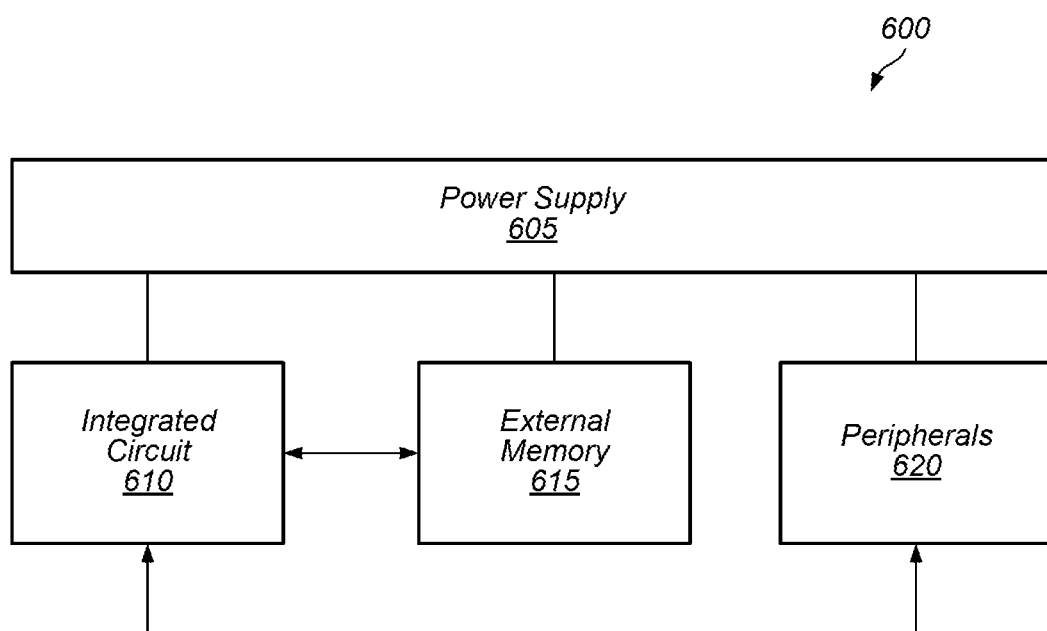
FIG. 6 is a block diagram of a system, according to some embodiments.

In FIG. 6, one embodiment of a computer system 600 is illustrated. Various embodiments of this system may be included in front end server 120, backend server 160, AI system 170, or any other computer system.

In the illustrated embodiment, system 500 includes at least one instance of an integrated circuit (processor) 610 coupled to an external memory 615. The external memory 615 may form a main memory subsystem in one embodiment. The integrated circuit 610 is coupled to one or more peripherals 620 and the external memory 615. A power supply 605 is also provided which supplies one or more supply voltages to the integrated circuit 610 as well as one or more supply voltages to the memory 615 and/or the peripherals 620. In some embodiments, more than one instance of the integrated circuit 610 may be included (and more than one external memory 615 may be included as well).

The memory 615 may be any type of memory, such as dynamic random access memory (DRAM), synchronous DRAM (SDRAM), double data rate (DDR, DDR2, DDR6, etc.) SDRAM (including mobile versions of the SDRAMs such as mDDR6, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit 610 in a chip-on-chip configuration, a package-on-package configuration, or a multi-chip module configuration.

The peripherals 620 may include any desired circuitry, depending on the type of system 600. For example, in one embodiment, the system 600 may be a mobile device (e.g. personal digital assistant (PDA), smart phone, etc.) and the peripherals 620 may include devices for various types of wireless communication, such as Wi-fi, Bluetooth, cellular, global positioning system, etc. Peripherals 620 may include one or more network access cards. The peripherals 620 may also include additional storage, including RAM storage, solid state storage, or disk storage. The peripherals 620 may include user interface devices such as a display screen, including touch display screens or multitouch display screens, keyboard or other input devices, microphones, speakers, etc. In other embodiments, the system 600 may be any type of computing system (e.g. desktop personal computer, server, laptop, workstation, net top etc.). Peripherals 620 may thus include any networking or communication devices. By way of further explanation, in some embodiments system 600 may include multiple computers or computing nodes that are configured to communicate together (e.g. computing cluster, server pool, cloud computing system, etc.).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed by various described embodiments. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
   accessing a first plurality of user-generated database queries executed by a plurality of different users on one or more databases;
   extracting, from each user-generated database query in the first plurality of user-generated database queries, a corresponding set of features representing different characteristics of the user-generated database query, wherein the different characteristics comprise at least one of a length of the user-generated database query, a format of the user-generated database query, or a styling of the user-generated database query;
   creating a set of artificial intelligence (AI) training data based on the corresponding sets of features;
   training a machine learning (ML) classifier using the set of AI training data and corresponding labels for each of the first plurality of user-generated database queries, wherein each of the corresponding labels indicates an identity of one of the plurality of different users that is associated with a corresponding query, and wherein the trained ML classifier is configured to produce vector outputs in a vector space in response to receiving database queries;
   extracting, by a computer system from a first user-generated database query associated with a first user, a first set of features representing the different characteristics of the first user-generated database query;
   obtaining a first output vector in the vector space based on providing the first set of features to the trained ML classifier; and
   based on the first output vector, determining, by the computer system, if the first user-generated database query represents a data access anomaly.

2. The method of claim 1, wherein the determining if the first user-generated database query represents a data access anomaly comprises:
   determining a first distance between the first output vector and a first centroid for queries associated with the first user.

3. The method of claim 2, wherein the determining if the first user-generated database query represents a data access anomaly further comprises:
   determining if the first distance exceeds a threshold value.

4. The method of claim 1, wherein the determining if the first user-generated database query represents a data access anomaly comprises:
   determining if a first centroid for queries associated with the first user is within K closest neighboring centroids to the first output vector, where K is a predefined integer greater than one.

5. The method of claim 1, wherein the styling of the user-generated database query represents a number of comments used in the user-generated database query.

6. The method of claim 1, further comprising:
   in response to a determination by the computer system that the first user-generated database query represents a data access anomaly, automatically initiating a remedial action against a system account of the first user.

7. The method of claim 6, wherein the remedial action includes transmitting an electronic alert regarding the first user-generated database query to a system administrator.

8. The method of claim 6, wherein the automatically initiating the remedial action is based on a type of data being accessed by the first user-generated database query.

9. The method of claim 8, wherein the type of data includes at least one of financial data, customer data, or personally identifying information.

10. The method of claim 1, further comprising:
    determining, from a set of users, the plurality of different users for generating the set of AI training data based on a number of user-generated database queries previously submitted by each user in the set of users, wherein each user in the plurality of different users has previously submitted at least a minimum threshold number of user-generated database queries, wherein the set of users includes the first user.

11. A non-transitory computer-readable medium having stored thereon instructions that when executed by a computer system cause the computer system to perform operations comprising:
    providing a first user-generated database query from a first user to a trained machine learning classifier;
    receiving a first output vector in a vector space, wherein:
       a first plurality of user-generated database queries was executed by a plurality of different users on one or more databases;

a set of artificial intelligence (AI) training data was created by extracting a plurality of features from each of the first plurality of user-generated database queries, wherein the plurality of features represents different characteristics of a corresponding database query, and wherein the different characteristics comprise at least one of a length of the corresponding database query, a format of the corresponding database query, or a styling of the corresponding database query; and the trained machine learning classifier was trained using the set of AI training data and corresponding labels for each of the first plurality of user-generated database queries, wherein each of the labels indicates an identity of one of the plurality of different users that is associated with a corresponding user-generated database query; and based on the first output vector, determining if the first user-generated database query represents a data access anomaly.

12. The non-transitory computer-readable medium of claim 11, wherein the determining if the first user-generated database query represents a data access anomaly comprises:
determining a first distance between the first output vector and a first centroid for queries associated with the first user.

13. The non-transitory computer-readable medium of claim 11, wherein the determining if the first user-generated database query represents a data access anomaly comprises:
determining if a first centroid for queries associated with the first user is within K closest neighboring centroids to the first output vector, where K is a predefined integer greater than one.

14. The non-transitory computer-readable medium of claim 11, wherein the operations further comprise:
in response to a determination that the first user-generated database query represents a data access anomaly, automatically initiating a remedial action against a system account of the first user.

15. The non-transitory computer-readable medium of claim 14, wherein the automatically initiating the remedial action is based on a type of data being accessed by the first user-generated database query.

16. A system, comprising:
one or more hardware processors; and
a non-transitory computer-readable medium having stored thereon instructions that when executed by the one or more hardware processors cause the system to perform operations comprising:
accessing a first plurality of user-generated database queries executed by a plurality of different users on one or more databases;
extracting, from each user-generated database query in the first plurality of user-generated database queries, a corresponding set of features representing different characteristics of the database query, wherein the different characteristics comprise at least one of a length of the user-generated database query, a format of the user-generated database query, or a styling of the user-generated database query;

creating a set of artificial intelligence (AI) training data based on the corresponding sets of features;

training a machine learning (ML) classifier using the set of AI training data and corresponding labels for each of the first plurality of user-generated database queries, wherein each of the corresponding labels indicates an identity of one of the plurality of different users that is associated with a corresponding query, and wherein the trained ML classifier is configured to produce vector outputs in a vector space in response to receiving database queries;

extracting, from a first user-generated database query associated with a first user, a first set of features representing the different characteristics of the first user-generated database query;

obtaining a first output vector in the vector space based on providing the first set of features to the trained machine learning classifier; and based on the first output vector, determining if the first user-generated database query represents a data access anomaly.

17. The system of claim 16, wherein the determining if the first user-generated database query represents a data access anomaly comprises:
determining a first distance between the first output vector and a first centroid for queries associated with the first user.

18. The system of claim 17, wherein the determining if the first user-generated database query represents a data access anomaly further comprises:
determining if the first distance exceeds a threshold value.

19. The system of claim 16, wherein the operations further comprise:
determining, from a set of users, the plurality of different users for generating the set of AI training data based on a number of user-generated database queries previously submitted by each of the set of users, wherein each user in the plurality of different users has previously submitted at least a minimum threshold number of user-generated database queries.

20. The system of claim 16, wherein the determining if the first database query represents a data access anomaly comprises:
determining if a first centroid for queries associated with the first user is within K closest neighboring centroids to the first output vector, where K is a predefined integer greater than one.

* * * * *